Jan. 29, 1957
C. SIGARDSON
2,779,454
FLIGHT CONVEYOR WITH RENEWABLE FLIGHTS
Filed Feb. 1, 1952
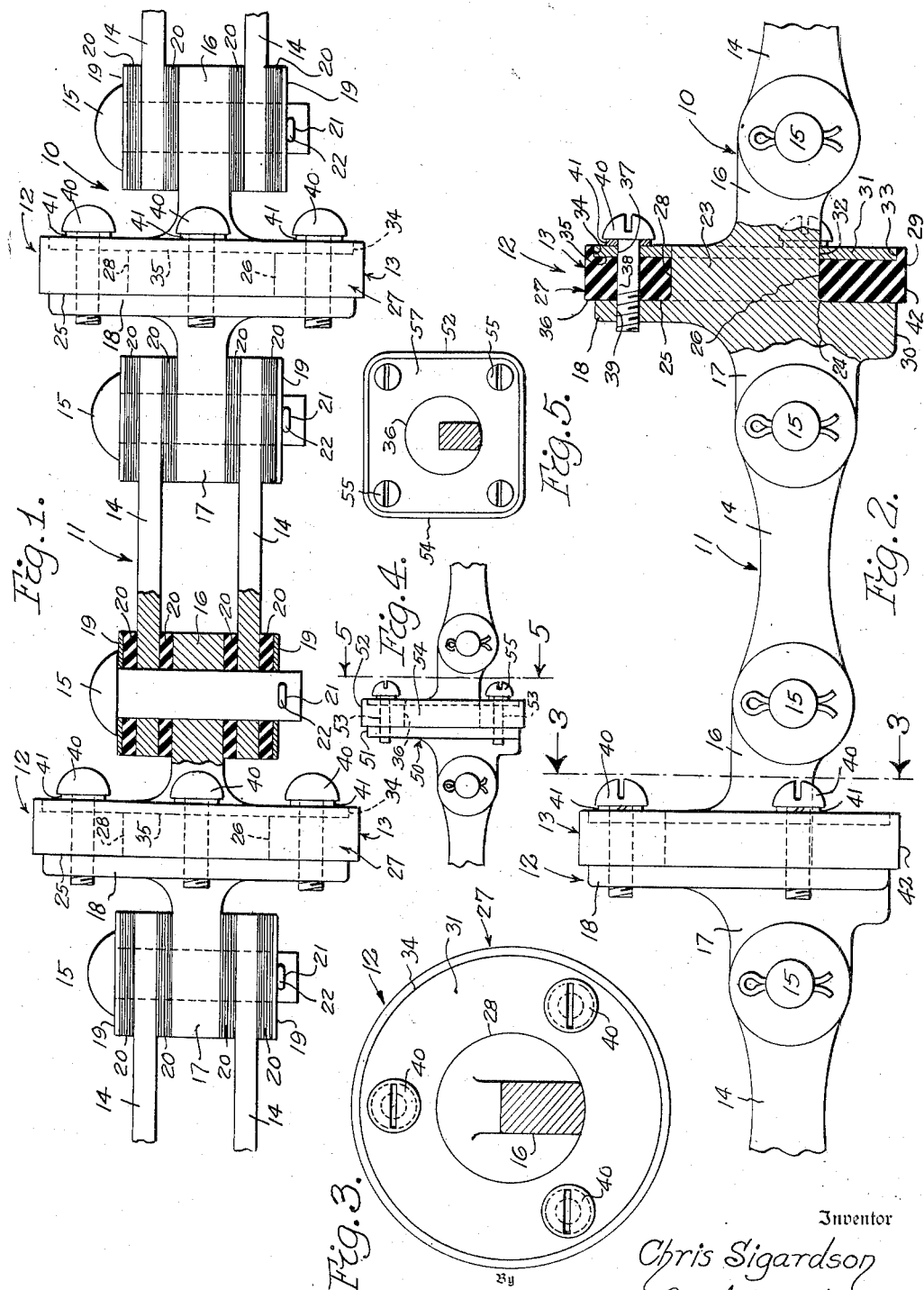
Inventor
Chris Sigardson
Barthel + Bugbee
Attorneys United States Patent Office 2,779,454
Patented Jan. 29, 1957

2,779,454

FLIGHT CONVEYOR WITH RENEWABLE FLIGHTS

Chris Sigardson, Kalamazoo, Mich., assignor to Hapman Conveyors, Inc., Kalamazoo, Mich., a corporation of Michigan Application February 1, 1952, Serial No. 269,377

1 Claim. (Cl. 198—176)

This invention relates to conveyors, and in particular, to flight conveyors.

One object of this invention is to provide a flight conveyor having flights eccentrically mounted on a flexible propelling member such as a chain, the flights being equipped with peripheral sealing portions which are adjustable to a plurality of positions in order to take up wear, thereby increasing the useful working life of the flights.

Another object is to provide a flight conveyor of the foregoing character wherein the peripheral sealing portion of the conveyor flight is rotatable for wear takeup purposes relatively to the remainder of the flight without requiring disassembly of the conveyor chain.

Another object is to provide a flight conveyor of the foregoing character wherein the peripheral sealing portion may be easily replaced, when worn, without disturbing the major portion of the flight other than to remove the pintle pin of the chain in order to insert a new sealing portion.

Other objects and advantages of the invention will become apparent during the course of the following description of the accompanying drawing, wherein:

Figure 1 is a top plan view, partly in section, of a portion of a flight conveyor equipped with the adjustable peripheral sealing ring, according to the present invention;

Figure 2 is a side elevation of the portion of the flight conveyor shown in Figure 1, with one of the flights shown in central vertical section;

Figure 3 is a cross-section through the conveyor chain taken along the line 3—3 in Figure 2, thereby showing the flight and its peripheral sealing ring in front elevation;

Figure 4 is a side elevation of a portion of a modified flight conveyor also equipped with an adjustable peripheral sealing member, according to the present invention; and Figure 5 is a cross-section through the modified conveyor chain taken along the line 5—5 in Figure 4.

Hitherto, the continued operation of flight conveyors in the conveyor conduit in which they run has resulted in uneven wear upon the peripheries of the flights, particularly where the flights are eccentrically mounted upon the chain so that the weight of the chain holds the flight upright and thus concentrates the wear at the bottom of the flight.

The present invention provides a conveyor flight having a flight disc with an annular sealing periphery or ring which is normally clamped in one position, but which may be unclamped, rotated to a different position, and then reclamped in the latter position. In this way, the wear on the periphery of the disc flight is distributed over the entire periphery of the flight, thereby greatly adding to the working life and efficiency of the flight. The same construction also enables the flight periphery to be adjusted without distributing the remainder of the flight or flight conveyor chain, and also enables the complete replacement of worn peripheral flight sealing rings with a minimum of effort of interference with the remainder of the flight conveyor.

Referring to the drawing in detail, Figures 1 and 2 show a short portion of an endless flight conveyor, generally designated 10, and consisting generally of a conveyor chain 11 carrying circular disc flights 12 equipped with a rotatable peripheral sealing ring device, generally designated 13. The conveyor chain 11 may be of any suitable type, the type shown being solely for purposes of illustration and not by way of limitation. As shown, the conveyor chain 11 consists of links 14 spaced laterally apart from one another and bored to receive pivot pins or pintle pins 15 which also pass through similarly bored lugs or ears 16 and 17 projecting axially in opposite directions from the discs 18 of the conveyor flights 12 and disposed eccentrically thereof. Interposed between the links 14, lugs 16, 17 and end washers 19 are resilient washers 20 of elastic deformable material, such as natural or synthetic rubber or combinations thereof, synthetic plastic or the like. The pivot or pintle pins 15 are provided with heads at one end and transverse holes 21 at their other ends with cotter pins 22 for retaining these assemblies in position, as shown in Figures 1 and 2.

The lugs or ears 16 are narrower than the lugs 17 as shown at the right-hand end of Figure 2, the lugs 17 merging smoothly into the flight discs 18 which are cut away at their central portions or hubs 23 (Figure 2) to provide an annular recess 24 having an annular abutment surface 25 and a cylindrical surface 26 on the periphery of the hub portion 23. Mounted on the peripheral surface 26 of the flight hub portion 23 and seated in the annular recess 24 against the annular abutment surface 25 is a peripheral sealing ring 27, preferably of elastic deformable material such as natural or synthetic rubber or synthetic plastic. The ring 27 has a central bore 28 fitting over the hub surface 26 and a peripheral surface 29 which projects beyond the rim 30 of the flight disc 18 so as to engage the conveyor conduit (not shown).

The peripheral sealing ring 27 is held in position by a retaining ring 31 which is in the form of an annular washer having a central bore 32 adapted to fit the hub surface 26 and having a peripheral edge 33 which is of slightly smaller diameter than the diameter of the peripheral surface 29 of the sealing ring 27 so as to fit into an annular recess 34 in the front surface 35 of the sealing ring 27, the rearward surface 36 of which engages the annular abutment surface 25 of the flight disc 18. The lugs or ears 16 are of sufficiently narrower widths than the lugs or ears 17 to permit their insertion into the central bores 28 and 32 in the sealing ring 27 and retaining ring 31 respectively. The rings 27 and 31 and the flight discs 18 are provided with circumferentially-spaced aligned holes 37, 38 and 39 respectively (Figure 2), these sets of holes being spaced at equal intervals around the circumference of the flight in order to permit the rings 27 to be removed and replaced in a new position rotated a partial revolution from their former positions. The holes 39 in the flight discs 18 are threaded to receive the ends of retaining screws 40 which pass through lock washers 41 and through the holes 37 and 38 in the retaining rings 31 and sealing rings 27 respectively.

In the operation of the invention, let it be assumed that the flight conveyor is assembled as shown in Figures 1 and 2 and trained through a conveyor conduit (not shown) and around a suitable drive sprocket or drive wheel (also not shown). The flight conveyor 10 is thus usually an endless conveyor in the form of an endless chain driven by a drive sprocket actuated by a motor through reduction gearing. Such driving mechanisms are conventional and form no part of the present invention. As a result of long-continued operation of the flight conveyor 10, the sealing rings 27 undergo excessive wear at the locations indicated by the reference numeral 42, namely at the bottom of the flight discs 18. This occurs because the weight of the conveyor chain 11 applied eccentrically of the flight discs 18 through the eccentrically-disposed lugs 16 and 17 normally causes the flight discs 18 to travel in upright positions.

When wear at the location 42 on the sealing ring 27 has become excessive, the operator or maintenance man removes the retaining screws 40 by means of a screw driver, rotates the worn sealing ring through a partial revolution until its holes 38 come into alignment with a new and different set of holes 39, the holes 37 remaining in alignment with the holes 38 if the retaining ring 31 is rotated as a unit with the sealing ring 27. When re-alignment has been established, the operator or maintenance man reinserts the retaining screws 40 and tightens them so as to clamp the sealing ring 27 firmly and immovably in its new position. If, as shown in the drawings, the three equally spaced retaining screws 40 are used in connection with each flight disc 18, the sealing ring 27 may be readjusted twice from its original position before it is necessary to discard the ring.

To replace a worn sealing ring 27 outright, the screws 49 and retaining ring 31 are removed completely, and the cotter pin 21 of the adjacent pintle pin 15 likewise removed and the latter withdrawn so as to separate the links 14 from the lugs 16. The old and worn sealing ring 27 may then be removed and replaced by a new sealing ring in the same position and the retaining ring 31 and screws 40 replaced, after which the links 14 may be reconnected to the lug 16 by means of the pintle pin 15.

The modified flight conveyor, generally designated 50, shown in Figures 4 and 5, is generally similar to the form of the invention shown in Figures 1, 2 and 3, and similar parts are therefore designated with the same reference numerals. In Figures 4 and 5, however, instead of the circular discs 18 of the conveyor flights 12, the corresponding portion 51 of the flight conveyor 50 is square and is fitted with a substantially square sealing member 52 of elastic deformable material, such as natural or synthetic rubber or synthetic plastic, having fastener holes 53 spaced equidistantly around its periphery, such as in its four corners 54. Fasteners 55 are inserted in these equally spaced holes 53. A central hole 56 is provided in the sealing member 52, and in the retaining member 57 which is also substantially square in outline in order to fit the substantially square members 51 and 52. In other respects the modified flight conveyor 50 is substantially similar to the flight conveyor 10 of Figures 1, 2 and 3.

The operation of the modified flight conveyor 50 is also similar to that of the flight conveyor 10, except that the conveyor 50 operates in a conveyor conduit of square cross-section rather than of circular cross-section. Wear is naturally the greatest on the lower edge of the square sealing member 52 because the downwardly-offset location of the chain causes the conveyor to travel in the position shown in Figures 4 and 5. When the lower edge of the sealing member 52 has become worn excessively, the fasteners 55 are removed and the sealing member 52 rotated through a quarter turn. The retaining member 57 and fasteners 55 are then replaced in their original positions. When excessive wear occurs, this procedure can be repeated, so that each sealing member 52 can be shifted three times after becoming worn in its original position before it requires replacement.

What I claim is:

A flight conveyor comprising an endless flexible conveyor chain composed of pivotally interconnected links disposed in an endless path, conveyor flight members mounted transversely upon certain of said links intermediate the opposite ends thereof at intervals along said chain, open-centered wear members of larger diameter than said flight members disposed in face-to-face engagement with said flight members with their peripheral edges projecting transversely beyond the peripheral edges of said flight members, open-centered clamping members of smaller diameter than said wear members disposed in face-to-face engagement with said wear members on the opposite sides thereof from their respective flight members, each flight member and its respective wear member and clamping member being provided with a plurality of sets of aligned fastener holes disposed at substantially equal radial distances from the centers thereof and spaced at substantially equiangular intervals around the circumferences thereof, and fasteners passing through said holes and securing said members to one another, the flight-bearing links passing through the apertures in said wear members and clamping members to one side of the centers thereof so that the weight of the chain holds the flight members and wear members upright and concentrates the wear on the wear members at the portions thereof beneath the chain, whereby to enable the fasteners and wear members to be removed and the wear members to be rotated a partial revolution and replaced in new positions presenting new and unworn wear portions of the wear members beneath the chain.

References Cited in the file of this patent

UNITED STATES PATENTS

| | | |
|---|---|---|
| 175,431 | Cooper | Mar. 28, 1876 |
| 499,525 | Dodge | June 13, 1893 |
| 810,149 | Horst | Jan. 16, 1906 |
| 961,933 | Burtner | June 21, 1910 |
| 2,429,549 | Hapman | Oct. 21, 1947 |
| 2,564,688 | Hapman | Aug. 21, 1951 |
| 2,607,469 | Hapman | Aug. 19, 1952 |

FOREIGN PATENTS

| | | |
|---|---|---|
| 305,930 | Great Britain | Jan. 23, 1930 |